Jan. 24, 1928.
A. J. REEDY
1,657,136
COMBINED COOKING AND HEATING STOVE
Filed Oct. 5, 1925
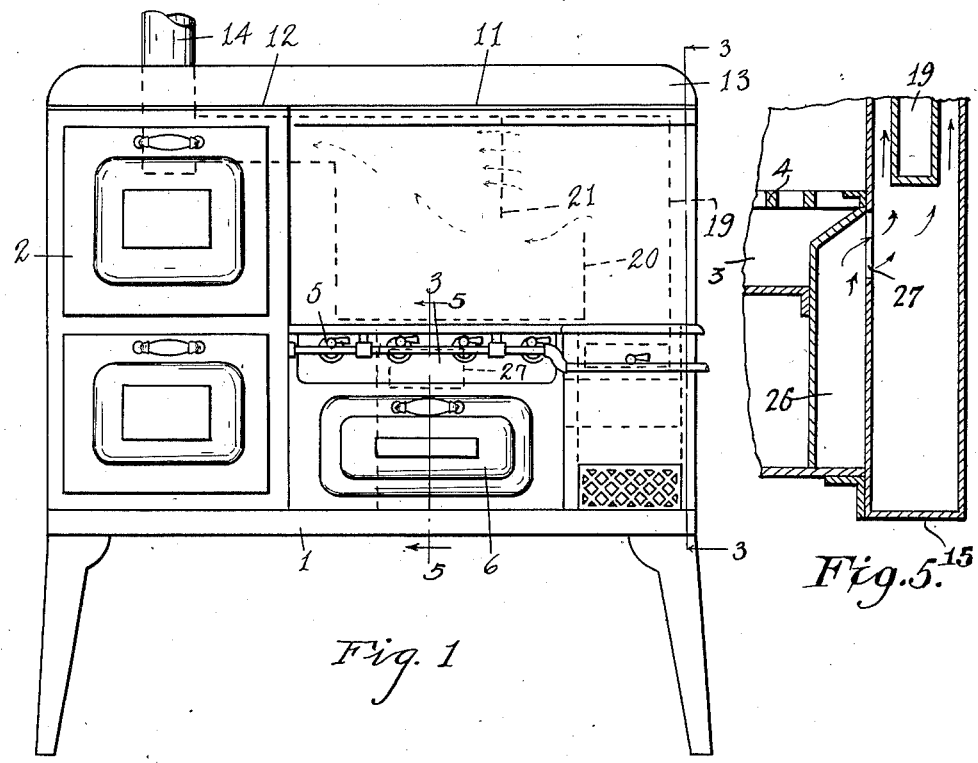
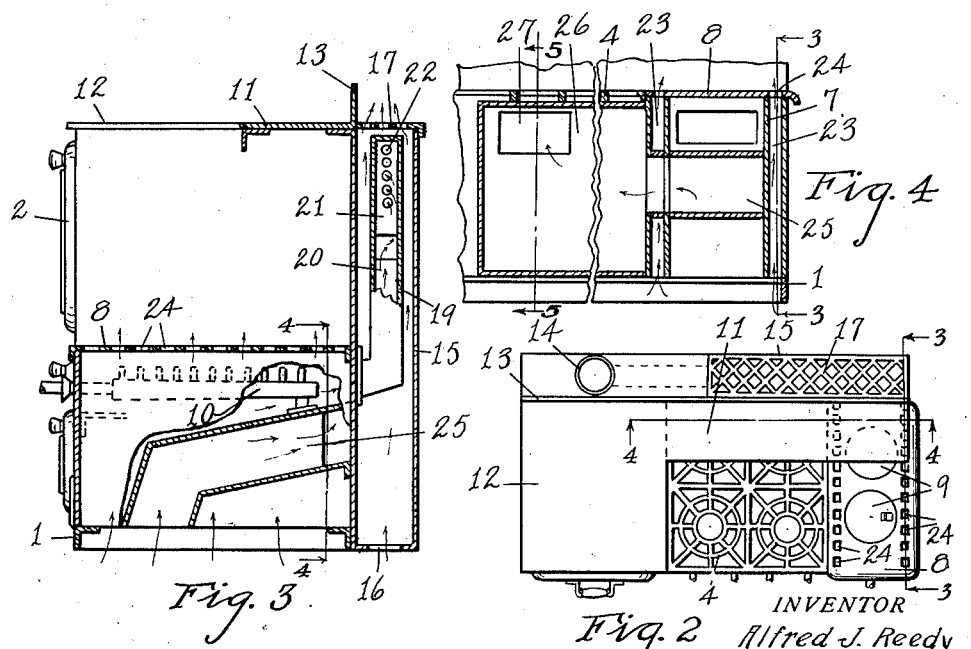
INVENTOR
Alfred J. Reedy
BY
Chappell Earl
ATTORNEYS Patented Jan. 24, 1928.

1,657,136

UNITED STATES PATENT OFFICE.

ALFRED J. REEDY, OF BATTLE CREEK, MICHIGAN, ASSIGNOR TO A.-B. STOVE COMPANY, OF BATTLE CREEK, MICHIGAN.

COMBINED COOKING AND HEATING STOVE.

Application filed October 5, 1925. Serial No. 60,481.

My present improvements are an adaptation of and in some respects an improvement upon the combined cooking and heating stove illustrated and described in my application for Letters Patent filed August 5, 1925, Serial No. 48,263.

The main object of this invention is to provide an improved cooking and heating gas stove which is well adapted for the purpose and very economical and efficient as a heater.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a front elevation of my improved combined cooking and heating stove.

Fig. 2 is a plan view.

Fig. 3 is a vertical section on a line corresponding to line 3—3 of Figs. 1, 2 and 4.

Fig. 4 is a fragmentary view in section on a line corresponding to line 4—4 of Figs. 2 and 3.

Fig. 5 is a detail vertical section on a line corresponding to line 5—5 of Figs. 1 and 4.

Referring to the drawing, 1 represents the base frame provided with suitable legs. At one end of this frame is an oven unit designated generally by the numeral 2, the details of which are not shown as they form no part of this invention.

At the side of this oven unit is an open top or open burner unit comprising an open burner chamber 3 having a grid-like top 4, the burners 5 being arranged within this open burner chamber. Below this open burner chamber is a warming oven provided with a door 6.

At the side of the open burner unit is a closed burner unit comprising a burner chamber 7 having a closed top 8 provided with lids 9. The tops 4 and 8 are disposed in the same plane. The closed burner 10 is common to both of the lids 9 in the structure illustrated.

A shelf 11 extends from the top 12 of the oven. At the rear of this shelf is a backplate 13. At the rear of the oven unit is a discharge flue 14, an air heating drum 15 being arranged at the rear of the open and closed burner units. This air heating drum has air inlet openings 16 at the bottom and a discharge grid 17 at the top which is arranged at the rear of the back plate 13.

A flat discharge chamber 19 is arranged within the drum, the burner chamber 7 being connected to this chamber, and the chamber 19 in turn being connected to the flue 14. Baffles 20 and 21 are disposed vertically within this flue chamber, the baffle 21 extending from the top of the chamber and having a series of holes 22 therein so that a portion of the products of combustion pass through these openings, thus insuring the more complete heating of the entire flue chamber and thereby greater efficiency.

At the sides of the closed burner chamber are air heating flues 23, the top 8 having holes 24 therein constituting discharges for these air passages. An air heating passage 25 having an inlet at the bottom of the stove is arranged below the burner chamber and this has a lateral discharge connection 26 at the rear of the open burner chamber opening at 27 to the drum, thus further equalizing distribution and circulation of air within the heating drum 15.

My improved stove is highly efficient. The closed burner may be used when desired for heating purposes, the heating units being very effectively taken up during the passage of the products of combustion through the flue chamber. The air heating passages associated with the closed burner chamber add very materially to the efficiency and heating capacity of the stove.

Having thus described my invention what I claim as new and desire to secure by Letters Patent is:

1. A gas stove comprising an oven unit disposed at one end, an open burner unit at the side of said oven unit and a closed burner unit at the side of said open burner unit, said closed burner unit being provided with a burner chamber, tops for said burner units, the top for said closed burner unit being provided with lids, a discharge flue at the rear of said oven unit, a flat heating drum disposed at the rear of said open and closed burner units, said drum being open at the bottom and provided with a discharge at the top, a flue chamber disposed in said heating drum and having an inlet connection to said closed burner chamber and a discharge connection to said discharge flue, and independent air passages at the sides and bottom of said closed burner unit chamber, said closed burner unit top having discharge openings for the side air passages, the bottom air passage opening to said drum.

2. A gas stove comprising an oven unit disposed at one end, an open burner unit at the side of said oven unit and a closed burner unit at the side of said open burner unit, said closed burner unit being provided with a burner chamber, a discharge flue at the rear of said oven unit, a heating drum disposed at the rear of said open and closed burner units, said drum being open at the bottom and provided with a discharge at the top, a flue chamber disposed in said heating drum and having an inlet connection to said closed burner chamber and a discharge connection to said discharge flue, and an air passage at the side of said closed burner unit chamber with discharge at the top.

3. A gas stove comprising open and closed burner units disposed side by side, the closed burner unit being provided with a burner and having a top provided with a lid, an air drum disposed at the rear of said burner units and provided with a discharge at the top, a discharge flue for said closed burner unit disposed in said air drum, air heating passages at the sides of said burner chamber, said top having discharge openings for said passages, an air heating passage at the bottom of said burner chamber, and a delivery conduit therefor disposed at the rear of the open burner unit and opening to said air drum.

4. A gas stove comprising open and closed burner units disposed side by side, the closed burner unit being provided with a burner and having a top provided with a lid, an air drum disposed at the rear of said burner units and provided with a discharge at the top, a discharge flue for said closed burner unit disposed in said air drum, and air heating passages at the sides of said burner chamber, said top having discharge openings for said passages.

5. A gas stove comprising an open burner unit and a closed burner unit provided with a closed burner chamber, a heating drum disposed at the rear of said burner units, said drum being open at the bottom and provided with a discharge at the top, a discharge flue for said burner chamber disposed in said heating drum, and an air passage at the side and bottom of said closed burner unit chamber, the side air passage having a discharge opening at the top and the bottom air passage opening to said drum.

6. A gas stove comprising an open burner unit and a closed burner unit provided with a closed burner chamber, a heating drum disposed at the rear of said burner units, said drum being open at the bottom and provided with a discharge at the top, a discharge flue for said burner chamber disposed in said heating drum, and an air passage at the side of said closed burner unit chamber having a discharge opening at the top.

7. A gas stove comprising open and closed burner units disposed side by side, the closed burner unit being provided with a burner and having a closed top, an air drum disposed at the rear of said burner units and provided with a discharge at the top, a discharge flue for said closed burner unit disposed in said air drum, and an air heating passage operatively associated with said burner chamber, said top having a discharge for said passage.

8. A gas stove comprising a closed burner chamber provided with a top, an air heating drum, said burner chamber having a discharge flue disposed through said air heating drum, and air passages at the side and bottom of said burner chamber, said burner chamber top having a discharge opening for the side air passage, the bottom air passage opening to said drum.

9. A gas stove comprising a closed burner chamber provided with a top, an air heating drum, said burner chamber having a discharge flue disposed through said air heating drum, and air passages at the side and bottom of said burner chamber, said burner chamber top having a discharge opening for the side air passage.

10. A gas stove comprising a closed burner chamber provided with a top, an air heating drum, said burner chamber having a discharge flue disposed through said air heating drum, and an air passage adjacent said burner chamber, said top having a discharge opening for the air passage.

In witness whereof I have hereunto set my hand.

ALFRED J. REEDY.